Aug. 26, 1952  J. B. LA POTA  2,608,446
FLUX FEED MECHANISM FOR CUTTING TORCHES
Filed July 3, 1947  2 SHEETS—SHEET 1

INVENTOR.
John B. La Pota
BY
*Dean Fairbank & Hirsch*
ATTORNEYS

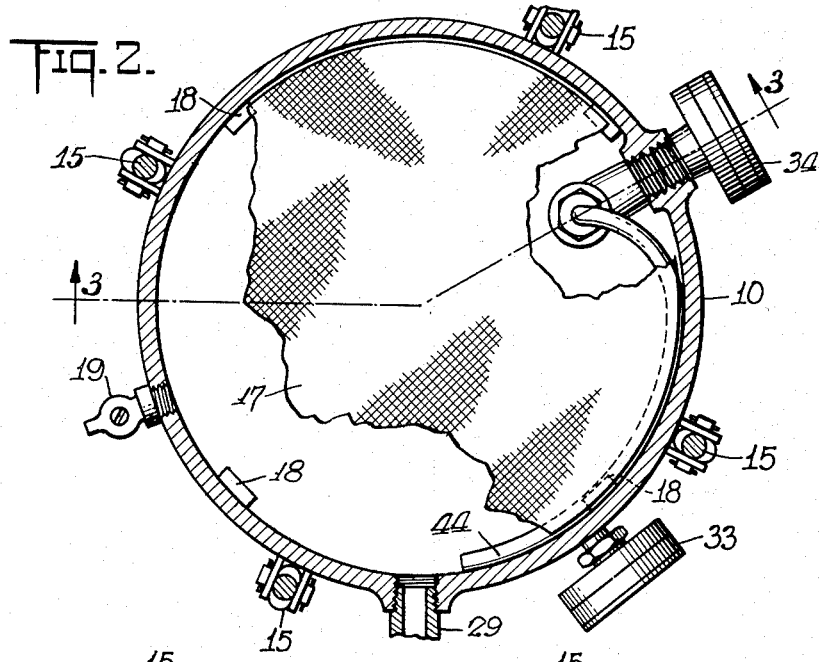
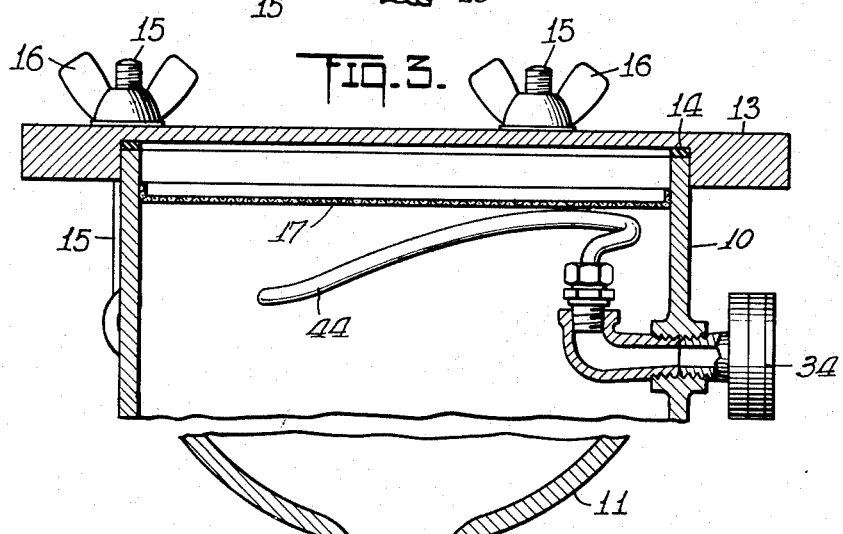
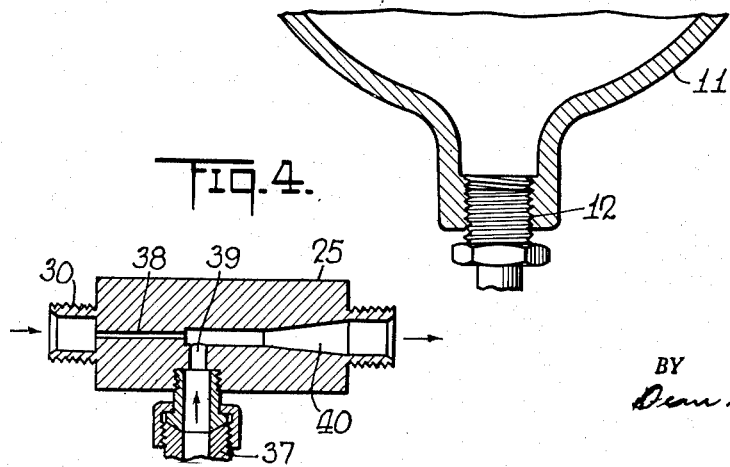
INVENTOR.
John B. La Pota
ATTORNEYS

Patented Aug. 26, 1952

2,608,446

UNITED STATES PATENT OFFICE 2,608,446

FLUX FEED MECHANISM FOR CUTTING TORCHES

John B. La Pota, Chicago, Ill., assignor to National Cylinder Gas Company, Chicago, Ill., a corporation of Delaware Application July 3, 1947, Serial No. 758,736

4 Claims. (Cl. 302—53)

In the cutting of steel it is common practice to apply a high pressure oxygen jet or stream to the steel which is heated along the line of the desired cut by a flame, usually of oxygen and acetylene, but this is not satisfactory for the cutting of stainless steel and other materials requiring a cutting temperature higher than that required for ordinary steel or iron. Successful cutting of stainless steel and other material requiring such higher temperature may be effected by delivering a flux material along with the oxygen stream or the flame forming gases, and in or at the desired cut. This flux is usually in powder form, and may be finely divided iron, although various other materials may be used.

To obtain uniform delivery of the flux powder to the point of use, it has been found to be desirable to carry it in a gas stream. The carrier gas may be the high pressure oxygen, or the combustion gas mixture, or a separate stream of inert gas. I have found that certain advantageous results are obtained if the carrier gas be a mixture of an inert gas such as nitrogen mixed with hydrogen in certain limiting proportion, as more fully set forth in my companion application Serial No. 154,894, filed April 8, 1950, which is a continuation-in-part of application Serial No. 752,289, filed June 3, 1947, now abandoned.

A very satisfactory form of torch in which the flux powder is delivered in a carrier gas, separate from the high pressure oxygen and the heating gas mixture, and projected against the article to be cut, is disclosed and claimed in companion application Serial No. 749,412, filed May 21, 1947.

The present invention involves an apparatus whereby the flux powder may be delivered to the carrier gas at the required rate, and various objections to types of apparatus previously used or proposed are overcome.

In carrying out my invention I employ a storage tank for the flux powder, and withdraw said powder at the desired rate by the action of the carrier gas under suitable pressure delivered through a Venturi type of ejector. In such an apparatus it is necessary to provide some means for shutting off the entire fluxing system when it is not required, and it is also necessary to provide some means for metering the flow of the flux powder to insure delivery at a uniform rate in accordance with the needs for the particular article to be cut.

In use many operating conditions vary, such as stopping and starting between successive cutting operations. The amount of flux required is different for different torch sizes and different types of articles to be cut. Portions of the flux powder may be slightly caked, so that the powder does not flow uniformly. The flux delivery conduit may become filled with powder when the flow of carrier gas is stopped. Various difficulties are encountered when it is attempted to control the flow of the carrier gas, the flux powder and/or the mixture of the two, by simple control valves.

In carrying out my invention I employ a novel type of flow delivery and control means whereby satisfactory operation is obtained under the various conditions of use.

In the accompanying drawing I have shown merely one of various constructions and arrangements of parts which may be employed, and embodying my invention. In these drawings:

Fig. 2 is a transverse section through the flux tank, on the line 2—2 of Fig. 1.

Fig. 3 is a vertical section of the top and bottom portions of the flux tank on the line 3—3 of Fig. 2, the pipe in the tank being shown in elevation, and Fig. 4 is a longitudinal section through the flux delivery and propelling unit.

Figure 1:
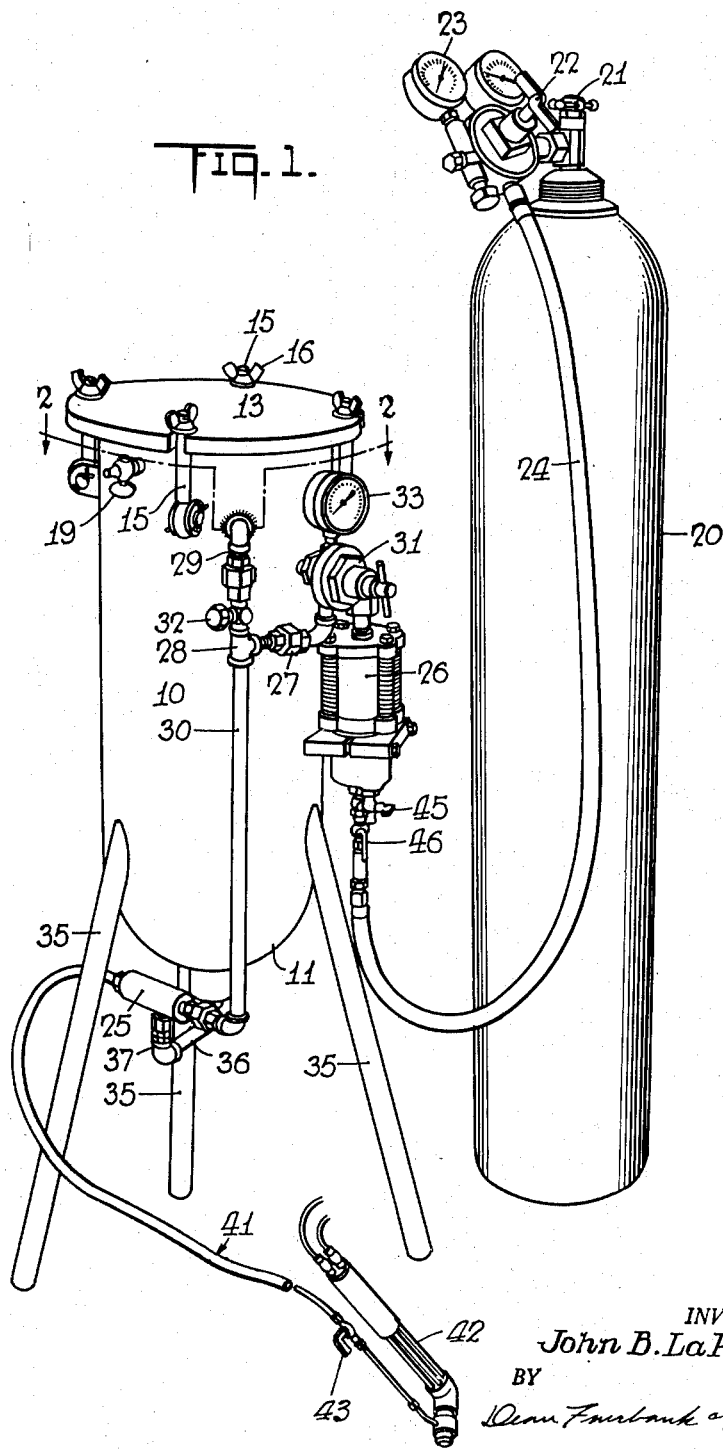
Fig. 1 is a perspective view of a preferred form of apparatus.

In the form illustrated there is provided a flux tank having a cylindrical body portion 10, a converging or hopper shaped bottom 11 with an outlet pipe connection 12 and a readily removable top or cover 13 which may be clamped on gas tight. As shown, the cover has a gasket 14, and the tank body has bolts 15 hinged thereto to swing into and out of slots in the cover and to be tightened on the gasket by wing nuts 16. Thus the cover may be easily and quickly removed for filling with the flux powder, and then clamped on gas tight. In the upper part of the tank there is preferably provided a screen 17 supported on small lugs 18 so that upon filling the tank, any lumps of flux powder must be broken up before reaching the body of the tank. At the upper part of the tank is a bleed valve or pet cock 19 for permitting reduction of the gas pressure in the tank.

The carrier gas may be supplied from any suitable source under pressure, for instance, a high pressure commercial gas cylinder 20 provided with the usual shut off valve 21, delivery control pressure valve 22 and gauges 23 for indicating the tank pressure and the delivery pressure in a hose 24.

As one feature of my invention the hose 24 delivers the carrier gas, which may for instance be nitrogen or other gas or gas mixture, to both the upper part of the tank and to a Venturi type of ejector 25 connected to the bottom of the tank. As shown, the hose 24 is connected to the bottom of a gas filter 26 mounted on the side of the tank 10, and the top of the filter has a detachable connection 27 to a T 28 with a branch 29 leading into the upper part of the tank 10 and a branch 30 leading to the ejector 25. The connection 27 preferably includes a pressure regulator 31, and the branch 29 includes a metering valve 32. Thus the carrier gas may be delivered to the ejector under the desired pressure, for instance 10 p. s. i. indicated on a gauge 33 mounted at the delivery side of the pressure regulator 31, and delivered through metering valve 32 to the top of the tank under a lower pressure, for instance 4 or 5 p. s. i., indicated on a gauge 34 mounted on the upper part of the tank.

The tank 10 is supported well above the floor in any suitable manner, as for instance by legs 35, and the tank outlet 12 has a horizontal pipe 36 with an upturned end section 37 entering the lower side of the ejector 25, as shown in Fig. 4. The ejector has a small gas inlet nozzle or passage 38 leading from the gas supply pipe 30 and discharging across the end of the flux powder inlet 39, and has a flaring discharge passage 40 in line with the gas nozzle 38 and leading to a hose 41 leading to the torch 42 conventionally indicated in Fig. 1, and which may be of various types, for instance that shown in application Serial No. 749,412, and which may be provided with a flux and gas shut off valve 43.

The gas supply pipe 29 leads to the upper part of the tank 10 at a point radially displaced from the gauge 34, and the gauge 34 is preferably connected to a pipe 44 which curves along the inner wall of the tank below the screen and terminates adjacent to the end of the pipe 29, so as to permit any powder stirred up by the inflowing gas to settle, and not enter the gauge 34.

The filter 26 preferably has a drain outlet provided with a pet cock 45, and the hose connection to the lower end of the filter preferably has a shut off valve 46 which may be used to shut off gas supply to the tank and ejector, instead of shutting it off by the valve 21 on the gas supply cylinder.

In normal operation the valve 19 is kept partly open so that the gas in the upper part of the tank is maintained under low pressure and flows down through the flux powder and aids in delivering it to the horizontal pipe 36, and aids in lifting it through upturned pipe 37 and the Venturi inlet 39. Thus the powder is kept in loose, easily flowable condition as it is picked up by the higher pressure gas jet emerging from the inlet passage 38 of the ejector 25. When cutting operation is temporarily stopped some of the powder will partially close the pipe 36, but this pipe acts as a pocket or baffle, so that little or none will flow up into the ejector to clog the latter or cause an excessive amount of powder being delivered to the torch when the next cutting operation is started. By reason of the bleed valve 19, pressure in the tank cannot build up when cutting operation is stopped, and thus the pressure in the tank will not force an excessive amount of powder into the ejector when the operation is started again. The pressure in the tank may be kept at any desired point by operation of the metering valve 32 and/or bleed valve 19, and is indicated on the gauge 34. With this valve partly open said pressure can never equal that in the pipe 30 delivering ejector gas to the Venturi nozzle. The feed of powder to the venturi is primarily by gravity, but accelerated by gas flow from the tank. When the supply of gas to the tank is shut off at the valve 21, the pressure in the tank 10 may drop to atmospheric through the bleed valve, but when it is turned on again the pressure in the tank cannot build up to the point where it will force powder up into the venturi to clog it.

By means of my improved construction the flux powder is delivered at a uniform rate which may be controlled by the pressure in the pipe 30 and the lower pressure in the tank, and there is no danger of damming up in or clogging the ejector during shut down periods.

Having thus described my invention, what I claim as new and desire to secure by Letters Patent is:

1. An apparatus for supplying flux powder to a cutting torch, including a closed flux powder tank, an ejector adjacent to and below said tank, conduit means to withdraw powder from said tank by gravity flow and to deliver said powder upwardly into said ejector, gas conduit means to supply a carrier gas for said powder to said ejector and to an upper portion of said tank, conduit means to deliver said carrier gas with said powder from said ejector to the cutting torch, means to control the flow of carrier gas and powder to said torch, valve means to deliver gas to said ejector at a predetermined superatmospheric pressure and to deliver gas to said tank at a predetermined pressure lower than that of gas delivered to said ejector, and gas pressure release means to prevent the gas pressure within said tank from increasing substantially when powder is not being withdrawn from said tank.

2. An apparatus for supplying flux powder to a cutting torch, including a closed flux powder tank, an ejector adjacent to and below said tank, conduit means to withdraw powder from said tank by gravity flow and to deliver said powder upwardly into said ejector, gas conduit means to supply a carrier gas for said powder to said ejector and to an upper portion of said tank, conduit means to deliver said carrier gas with said powder from said ejector to the cutting torch, means to control the flow of carrier gas and powder to said torch, valve means to deliver gas to said ejector at a predetermined superatmospheric pressure and to deliver gas to said tank at a predetermined pressure lower than that of gas delivered to said ejector, and adjustable means operative to maintain the predetermined differential between the pressures of the gas delivered to said ejector and to said tank, said adjustable means including a restricted gas outlet from an upper portion of said tank.

3. An apparatus for supplying flux powder to a cutting torch, including a closed flux powder tank, an ejector adjacent to and below said tank, conduit means to withdraw powder from said tank by gravity flow and to deliver said powder upwardly into said ejector, gas conduit means to supply a carrier gas for said powder to said ejector and to an upper portion of said tank, conduit means to deliver said carrier gas with said powder from said ejector to the cutting torch, means to control the flow of carrier gas and powder to said torch, valve means to deliver gas to said ejector at a predetermined superatmospheric pressure and to deliver gas to said tank at a predetermined pressure lower than that of gas delivered to said ejector, and adjustable means operative to maintain the predetermined differential between the pressures of the gas delivered to said ejector and to said tank, said adjustable means including a bleed valve permitting escape of gas at a controlled rate from an upper portion of said tank.

4. An apparatus for supplying flux powder material to a torch including a closed flux powder material tank, a Venturi ejector adjacent to and below said tank, conduit means to withdraw material from said tank by combined gravity flow and vacuum and to deliver said material upwardly into said ejector, gas conduit means including a gas filter and pressure regulator to supply a carrier gas for said material to said ejector and to an upper portion of said tank, conduit means to deliver said carrier gas with said material from said ejector to the torch, means to control the flow of carrier gas and material to said torch, valve means to deliver gas to said ejector at a predetermined superatmospheric pressure and to deliver gas to said tank at a lesser predetermined pressure than that of gas delivered to said ejector including gas pressure release means to maintain the gas pressure within said tank at said lesser predetermined pressure when material is not being withdrawn from said tank.

JOHN B. LA POTA.

REFERENCES CITED

The following references are of record in the file of this patent:

UNITED STATES PATENTS

| Number | Name | Date |
|---|---|---|
| 963,350 | Harrison | Aug. 23, 1910 |
| 2,181,095 | Ness | Nov. 21, 1939 |
| 2,518,811 | Nicholson | Aug. 15, 1950 |

FOREIGN PATENTS

| Number | Country | Date |
|---|---|---|
| 654,229 | Germany | Mar. 8, 1936 |